(12) United States Patent
Lim et al.

(10) Patent No.: US 11,375,758 B2
(45) Date of Patent: Jul. 5, 2022

(54) SELF-CUSTOMIZABLE MICRO LED GARMENT CAPABLE OF CHANGING COLORS AND PATTERNS LIKE TV SCREEN

(71) Applicants: Seong Kyu Lim, Daegu (KR); Myeong Hee Kim, Daegu (KR); Jong Ho Lim, Daegu (KR); Jong Yoon Lim, Daegu (KR)

(72) Inventors: Seong Kyu Lim, Daegu (KR); Myeong Hee Kim, Daegu (KR); Jong Ho Lim, Daegu (KR); Jong Yoon Lim, Daegu (KR)

( * ) Notice: Subject to any disclaimer, the term of this patent is extended or adjusted under 35 U.S.C. 154(b) by 0 days.

(21) Appl. No.: 17/429,266

(22) PCT Filed: Feb. 3, 2020

(86) PCT No.: PCT/KR2020/001570
§ 371 (c)(1),
(2) Date: Aug. 6, 2021

(87) PCT Pub. No.: WO2020/162676
PCT Pub. Date: Aug. 13, 2020

(65) Prior Publication Data
US 2022/0132942 A1 May 5, 2022

(30) Foreign Application Priority Data

Feb. 8, 2019 (KR) .................. 10-2019-0015080

(51) Int. Cl.
*A41D 1/00* (2018.01)
*G09G 3/32* (2016.01)
*G09F 21/02* (2006.01)

(52) U.S. Cl.
CPC ............... *A41D 1/002* (2013.01); *G09G 3/32* (2013.01); *G09F 21/023* (2020.05)

(58) Field of Classification Search
CPC .......... G09G 3/32; A41D 1/002; G09F 21/023
See application file for complete search history.

(56) References Cited

U.S. PATENT DOCUMENTS 9,693,409 B1 * 6/2017 Deniken ................ H05B 45/60
9,734,779 B2 * 8/2017 Forutanpour ........... G09F 9/301
(Continued)

FOREIGN PATENT DOCUMENTS

KR       20-0283119 Y1    7/2002
KR    20-2009-0006265 U   6/2009
(Continued)

OTHER PUBLICATIONS

International Search Report dated May 14, 2020 for corresponding international application No. PCT/KR2020/001570.
(Continued)

*Primary Examiner* — Muhammad N Edun
(74) *Attorney, Agent, or Firm* — Hauptman Ham, LLP (57) ABSTRACT

The present invention relates to a self-customizable micro LED garment capable of changing colors and patterns like a TV screen and, more particularly, to a useful invention comprising: a garment (100) composed of upper and lower garments (110, 120) worn on a wearer's body; a transparent micro LED display skin (300) coated on the surface of the garment (100); a master unit (400) and a remote slave (500) inside the upper and lower garments (110, 120) of the garment (100); and a smartphone (600), wherein the transparent micro LED display skin (300) is selectively controlled by means of an application installed on the smartphone (600) by the wearer to express a variety of colors according to the current situation of the wearer.

2 Claims, 8 Drawing Sheets

(56) References Cited

U.S. PATENT DOCUMENTS

| | | | | |
|---|---|---|---|---|
| 11,166,503 B2* | 11/2021 | Juhasz | ................. | B60Q 1/0023 |
| 2016/0041581 A1* | 2/2016 | Piccionelli | ............ | G09F 21/048 |
| | | | | 345/156 |

FOREIGN PATENT DOCUMENTS

| | | |
|---|---|---|
| KR | 10-1131483 B1 | 3/2012 |
| KR | 10-1381860 B1 | 4/2014 |
| KR | 10-1498714 B1 | 3/2015 |
| KR | 10-2016-0084281 A | 7/2016 |
| KR | 10-2018-0006580 A | 1/2018 |
| KR | 10-2018-0023227 A | 3/2018 |
| KR | 10-1839702 B1 | 3/2018 |

OTHER PUBLICATIONS

Written Opinion dated May 14, 2020 for corresponding international application No. PCT/KR2020/001570.

* cited by examiner

SELF-CUSTOMIZABLE MICRO LED GARMENT CAPABLE OF CHANGING COLORS AND PATTERNS LIKE TV SCREEN

CROSS-REFERENCE TO RELATED APPLICATION

The present application is a national stage filing under 35 U.S.C § 371 of PCT application number PCT/KR2020/001570 filed on Feb. 3, 2020 which is based upon and claims the benefit of priorities to Korean Patent Application No. 10-2019-0015080, filed on Feb. 8, 2019, in the Korean Intellectual Property Office. Both of the aforementioned applications are hereby incorporated by reference in their entireties.

TECHNICAL FIELD

The present invention relates to a self-customizable microLED garment capable of changing colors and patterns like a TV screen, more particularly, to a technique that allows a wearer to selectively change the color and pattern of a transparent microLED display skin like a TV screen by coating the transparent microLED display skin on the surface of one side of a top or a bottom of an ordinary garment, configuring a master unit and a remote slave for controlling the transparent microLED display skin, and connecting a smartphone so that the wearer may remotely control the transparent microLED display skin.

BACKGROUND ART

From hundreds of thousands of years ago or thousands of years ago when humans make and wear garments (clothes) to cover parts of the body, they have expressed wearer's beauty or personality by putting colors or patterns (embroidery, pictures, letters, etc.) in the garments.

Meanwhile, the trend of clothing fashion is that people wear garments unique to a person, i.e., the only one in the world, by even tearing pants to make a pattern expressing their own individuality. Until present, garments (clothes) made of fabric (cloth) having a color or a pattern determined by the manufacturer of the fabric (cloth) are worn passively.

In addition, people who enjoy hobbies or sports such as motorcycle, bicycle, inline skating, running, mountaineering, billiards, and the like wear clothes specialized for the hobbies or sports, and although those sport wears provide convenience for the wearers to enjoy the sports as various functionalities are added, since they wear special clothes attached with propaganda or logos related to corresponding sports in many cases, there is a problem in that they are not recognized by others in a situation such as at night or in a bad weather.

To solve these problems, it needs to develop clothes that allow a wearer to become a creative designer according to the surrounding environments of time and place so as to instantaneously, actively and diversely change the color or pattern of the clothes that he or she wears in order to express the wearer's own creative works, and in addition, in addition, and in addition, may further imprint logos or propaganda phrases on spectators watching corresponding sport games, and secure visibility at night to prevent safety accidents that may occur by mistake.

First, conventional techniques are described below.

Korean Patent Registration No. 10-1381860 discloses a technique related to a smart garment having a light emitting function. A smart garment including a jacket and pants is configured of a light emitting object attached at one end of the jacket of the garment according to a predetermined pattern; a control board attached at one end of the jacket of the garment to control the operation of the light emitting object; and a conductive thread connecting the light emitting object and the control board, wherein the light emitting object is a light emitting diode, the control board is a LilyPad Arduino, a zipper is formed in the armpit part of the jacket so that the armpit part may be selectively opened, a pocket is formed at one end of the pants, and a heat pack is inserted in the pocket.

Korean Patent Registration No. 20-0283119 discloses a technique related to a garment having a light emitting diode, which is configured by forming a perforated part of flower, heart, star or letter on a part of the garment, sewing a transparent object made of mesh, thin see-through fiber or transparent vinyl in the perforated part by means of sewing machine embroidery or machine embroidery along the edges to make them in one piece, tightly sealing a light emitting board, i.e., a flexible printed circuit board on which light emitting diodes are arranged, using a waterproof cloth to be positioned inside the perforated part, and attaching a cover for supporting the light emitting board inside the perforated part.

Korean Patent Registration No. 10-1131483 discloses a technique related to a light emitting safety garment having an energy saving function, and safety equipment attached to the garment comprises: a light emitting device seated on a pad to emit light; a reflective plate having an opening for receiving the light emitting device to be seated and reflecting light; a transparent film heat-sealed or high-frequency fused on the outer periphery of the opening of the reflective plate on the light emitting device to have a dense medium with respect to the air medium; a circuit unit for supplying power needed to drive the light emitting device for a connection unit that connects a light emitting power supply to the light emitting device; and a power supply unit for supplying power to the circuit unit.

Korean Patent Registration No. 20-2009-0006265 discloses a technique related to a light emitting garment using electro-luminescence (EL), the garment comprising: EL light emitting units configured of a plurality of ELs attached to the front and rear sides of the garment through a hot-melt adhesive, and a plurality of lead wires for supplying power to the ELs; joint units bonded to end portions where the plurality of ELs is installed to prevent infiltration of water into the garment; and a control unit connected to the plurality of lead wires to integrally control the EL light emitting units.

The conventional techniques described above do not consider the economic aspect at all, and the objects of the techniques are to achieve only the purpose of securing visibility at night, and therefore, they may not be used to enhance the fun in the places of ceremony, festival, party, event and the like, and in addition, the color of light emitted from an LED may be monotonous as the LED generally emits a single color, and a picture or a pattern itself is only a fixed expression, and since only a rechargeable or separate battery is used, it has a significant problem of power consumption and cannot be used for a long time.

DISCLOSURE OF INVENTION

Technical Problem

Therefore, the present invention has been made in view of the above problems, and it is an object of the present invention to provide a self-customizable microLED garment comprising: one or more transparent microLED display skins configured to be fully or partly coated on the outer surface of a garment; a master unit and a remote slave respectively configured at one end on the outer or inner surface of the garment at a position close to the transparent microLED display skin to control the transparent microLED display skin; and one or more smartphones connected to remotely control the master unit and the remote slave, wherein the transparent microLED display skin is controlled using an APP embedded in the smartphone so that a single color or multiple colors or a pattern may be diversely expressed as a change of a moving pattern like a TV screen.

Technical Solution

To accomplish the above object, according to one aspect of the present invention, there is provided a self-customizable microLED garment provide with a light emitting function and capable of changing colors and patterns like a TV screen, the garment comprising: a garment 100 configured of a top and a bottom that a user wears on a body; transparent microLED display skins 300 respectively configured on an outer side of the top 110 and the bottom 120 and including a transparent flexible substrate 310 having transparency and flexibility and a semiconductor device layer 320 having microLED pixels 330 transferred and attached on the transparent flexible substrate 310, and fully or partly coated on the surfaces of the top 110 and the bottom 120; a master unit 400 configured outside or inside the top 110 and provided with a power switch 410 for controlling a power supply unit 430, a charging port 420 for charging a battery through a USB cable, the power supply unit 430 controlled by the power switch 410, the battery 440 for storing power charged through the charging port 420, a wireless power supply unit 450 having a wireless electric coil to wirelessly supply power to the power supply unit 430, a short-range wireless communication unit 460 for performing short-range wireless communication with external devices and other devices including a smartphone 600, a main control unit 470 for controlling color expression in the transparent microLED display skin 300 of the garment 100, an energy harvesting unit 480 for self-generation of energy, and a photodetector 490 for detecting brightness of light outside the garment 100; a remote slave 500 configured at one end on an outer or inner surface of the bottom 120 and provided with a wireless electric antenna 510 for receiving power generated by the wireless power supply unit 450, a remote control unit 520 for driving and controlling the transparent microLED display skin 300, a transceiver unit 530 for performing close proximity remote transmission and reception with the master unit 400, an energy harvesting unit 540 for self-generation of energy, and a photodetector 550 for detecting outside and brightness (→brightness outside the garment 100); and a smartphone 600 including an APP capable of controlling the main control unit 470 or the remote control unit 520 of the master unit 400 or the remote slave 500 through a short-range wireless communication method with the master unit 400 and the short-range wireless communication unit 460 (→the short-range wireless communication unit 460 of the master unit 400), wherein the energy harvesting units 480 and 540 are configured of any one or a combination of a photoelectric element, a thermoelectric element, and a wireless electric conversion element, and when a specific transparent microLED display skin 300 is controlled through the APP, the transparent microLED display skin 300 is controlled by the master unit 400 or the remote slave 500 close to the specific transparent microLED display skin 300, and the microLED pixel 330 is a p-n diode layer, which is a compound semiconductor having a band gap, configured by sequentially stacking a positive electrode layer 331 that becomes a circuit pattern, bump or a conductive adhesive layer, a transparent conductive layer 332, a transparent p-electrode layer 333 for supplying power, a p-GaN layer 334, an active layer 335, an n-GaN layer 336, and a transparent N—GaN layer 337 having electrical conductivity, and a transparent insulating layer 338 is formed between the microLED pixels 330.

The photodetectors 490 and 550 detect the amount of external light applied to the garment 100, and then apply them to the main control unit 470 and the remote control unit 520, respectively, and the main control unit 470 and the remote control unit 520 control display luminance brightness of the transparent microLED display skin 300 based on the received amount of light.

Advantageous Effects

According to self-customizable microLED garment capable of changing colors and patterns like a TV screen, diverse colors or patterns may be changed easily like a TV screen according to the current situation of a user to immediately respond to a field situation, and vehicle drivers or the like may secure visibility in a dark place or at night, and at the same time, emblems such as logos may be expressed in various colors and patterns like a TV screen for users in a ceremony, a festival, a party, or an event or particularly for users belonging to an organization. Therefore, it is a technique that can effectively express logos and emblems to improve the advertising effect, and enhance the fun of users by changing colors variously, and has enough potentials to be developed into a leading flow of changes in mankind, clothing patterns, and fashions in the future, and is sufficient for many people to feel curiosity and fun. This is an innovative invention in the history of human clothing that has an effect of using for an extended period of time through low power consumption, rechargeable battery and autonomous power supply.

DESCRIPTION OF SYMBOLS

100: garment
110: top
120: bottom

300: transparent microLED display skin
310: transparent flexible substrate
320: semiconductor device layer
330: microLED pixel
331: positive electrode layer
332: transparent conductive layer
333: transparent p-electrode layer
334: p-GaN layer
335: active layer
336: n-GaN layer
337: transparent n-electrode layer
338: transparent insulating layer
400: master unit
410: power switch
420: charging port
430: power supply unit
440: battery
450: wireless power supply unit
460: short-range wireless communication unit
470: main control unit
480: energy harvesting unit
490: photodetector
500: remote slave
510: wireless electric antenna
520: remote control unit
530: transceiver unit
540: energy harvesting unit
550: photodetector
600: smartphone

BEST MODE FOR CARRYING OUT THE INVENTION

The present invention provides a self-customizable microLED garment capable of selectively changing colors of a transparent microLED display skin by coating the transparent microLED display skin at one end on the surface or on the entire surface of a top or a bottom of a general garment, configuring a master unit and a remote slave for controlling the transparent microLED display skin, and connecting a smartphone so that a wearer may remotely control the transparent microLED display.

Hereinafter, a preferred embodiment of the present invention for achieving the above objects in relation to the accompanying drawings will be described with reference to FIGS. 1 to 8.

First, the present invention is configured to include a garment 100, a transparent microLED display skin 300, a master unit 400, a remote slave 500, and a smartphone 600.

Figure 1:
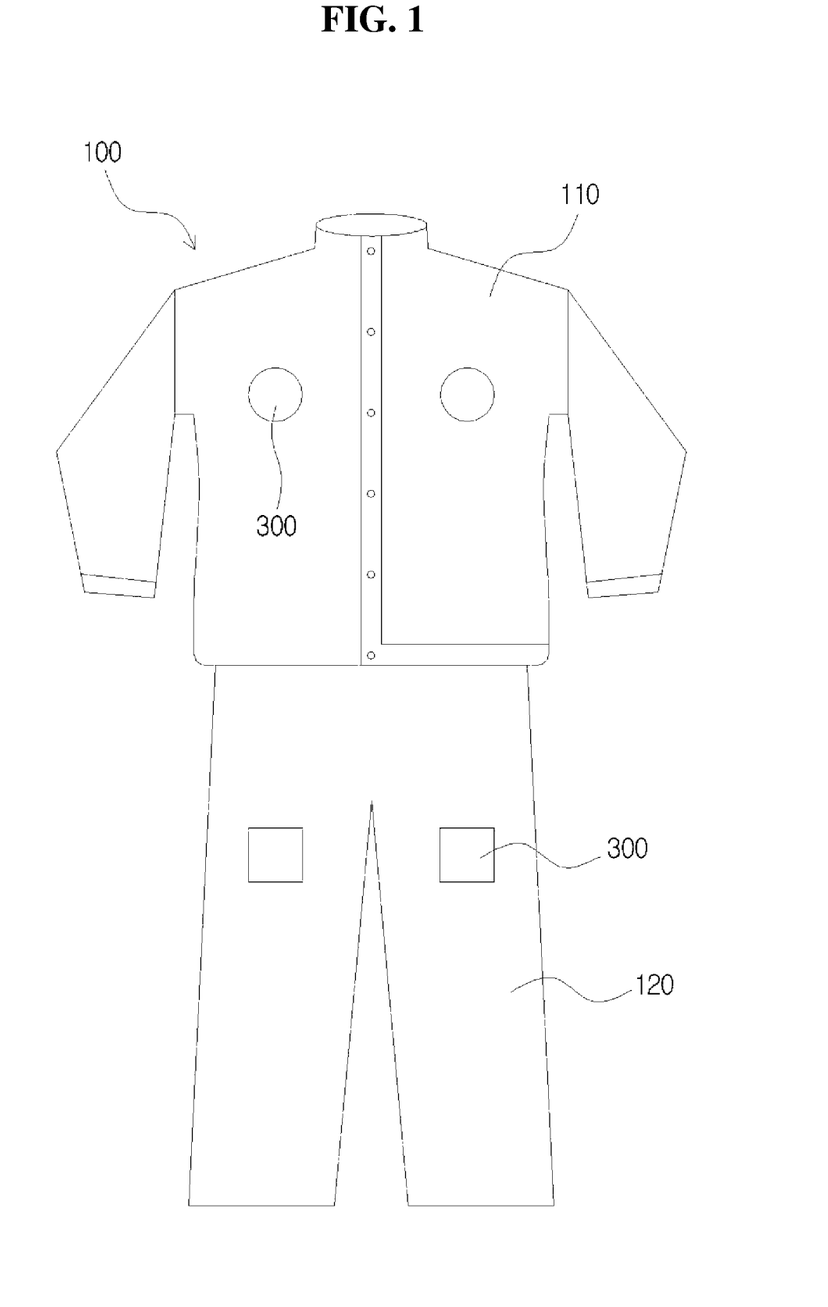
FIG. 1 is a view showing a preferred embodiment of the present invention.
Figure 2:
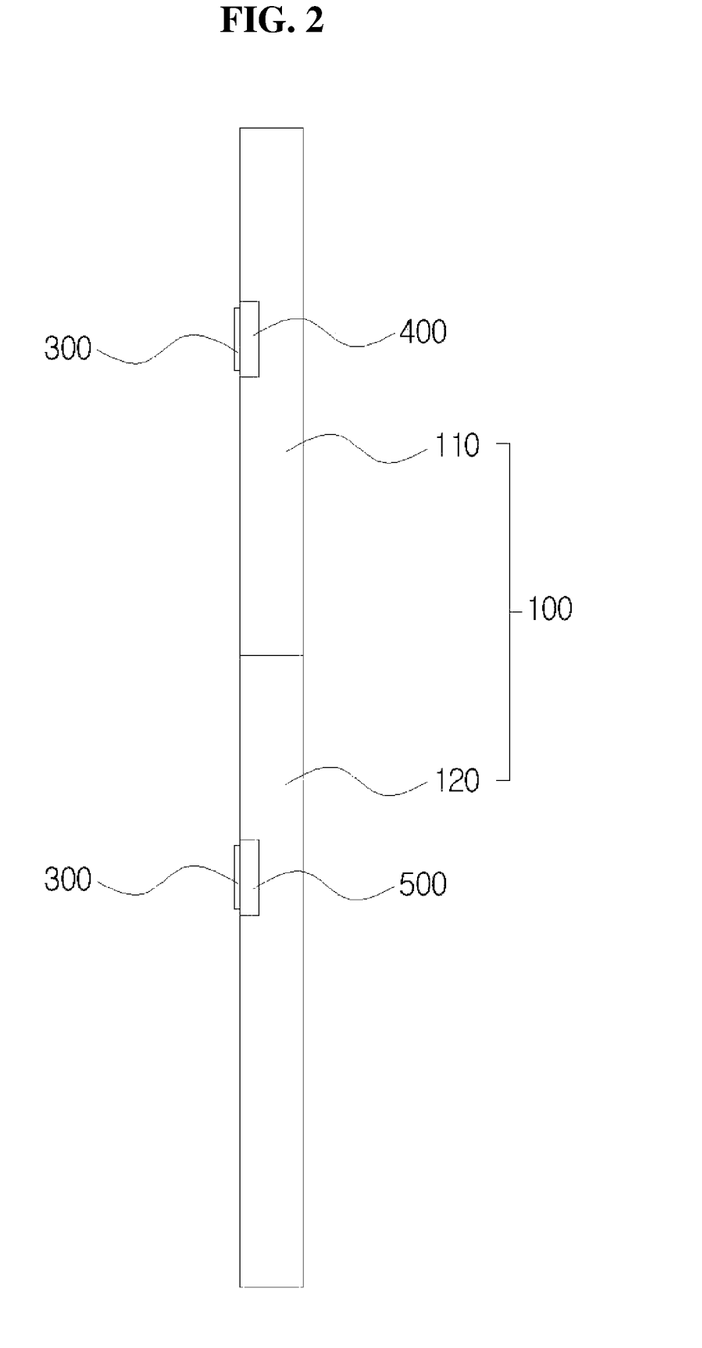
FIG. 2 is a view showing a preferred embodiment of the present invention.
Figure 7:
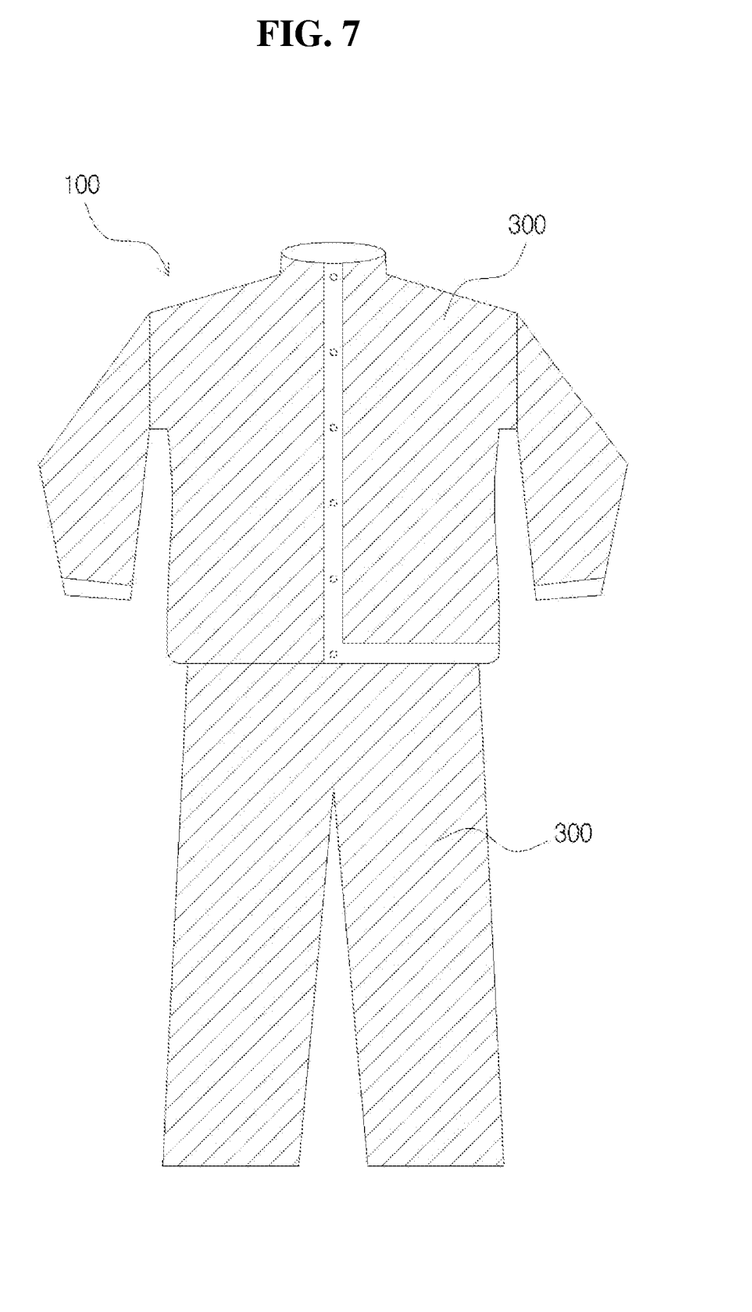
FIG. 7 is a view showing a preferred embodiment of the present invention.
Figure 8:
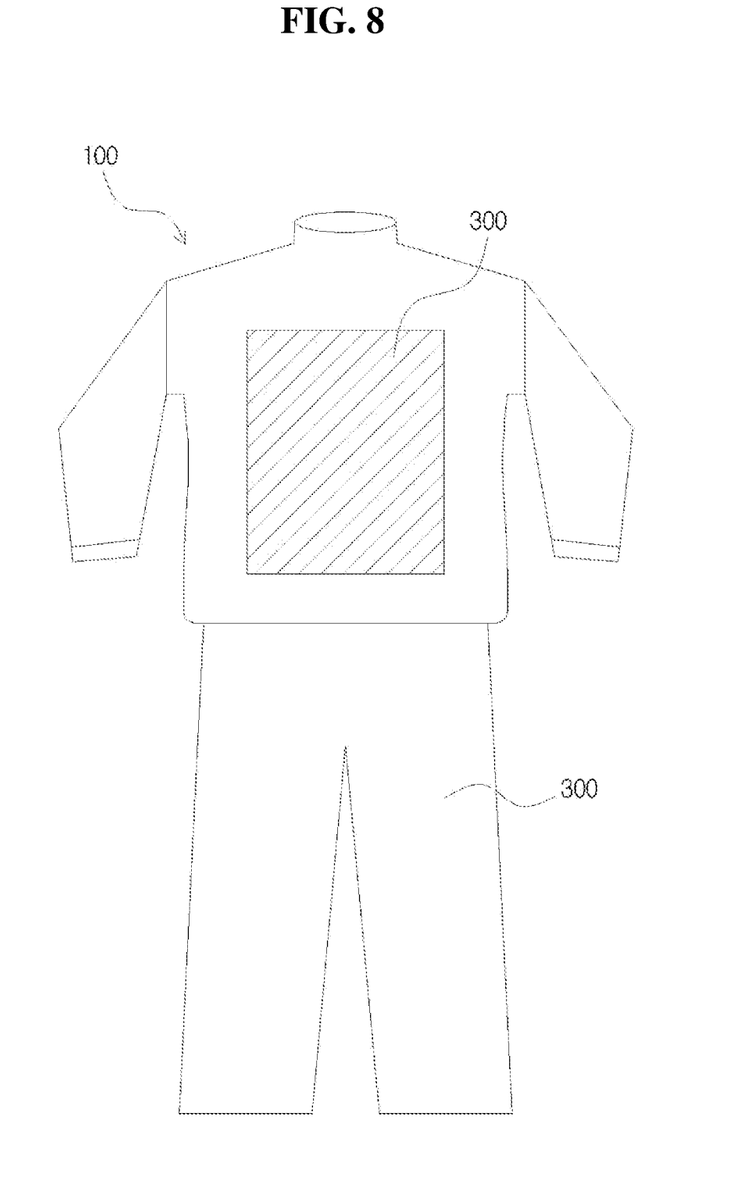
FIG. 8 is a view showing a preferred embodiment of the present invention.

As shown in FIGS. 1, 2, and 7, the garment 100 is configured of a top 110 and a bottom 120 respectively worn on the wearer's upper body and lower body. Here, the top 110 or the bottom 120 may have a conventionally configured pocket, and this is not shown in the present invention separately.

Figure 3:
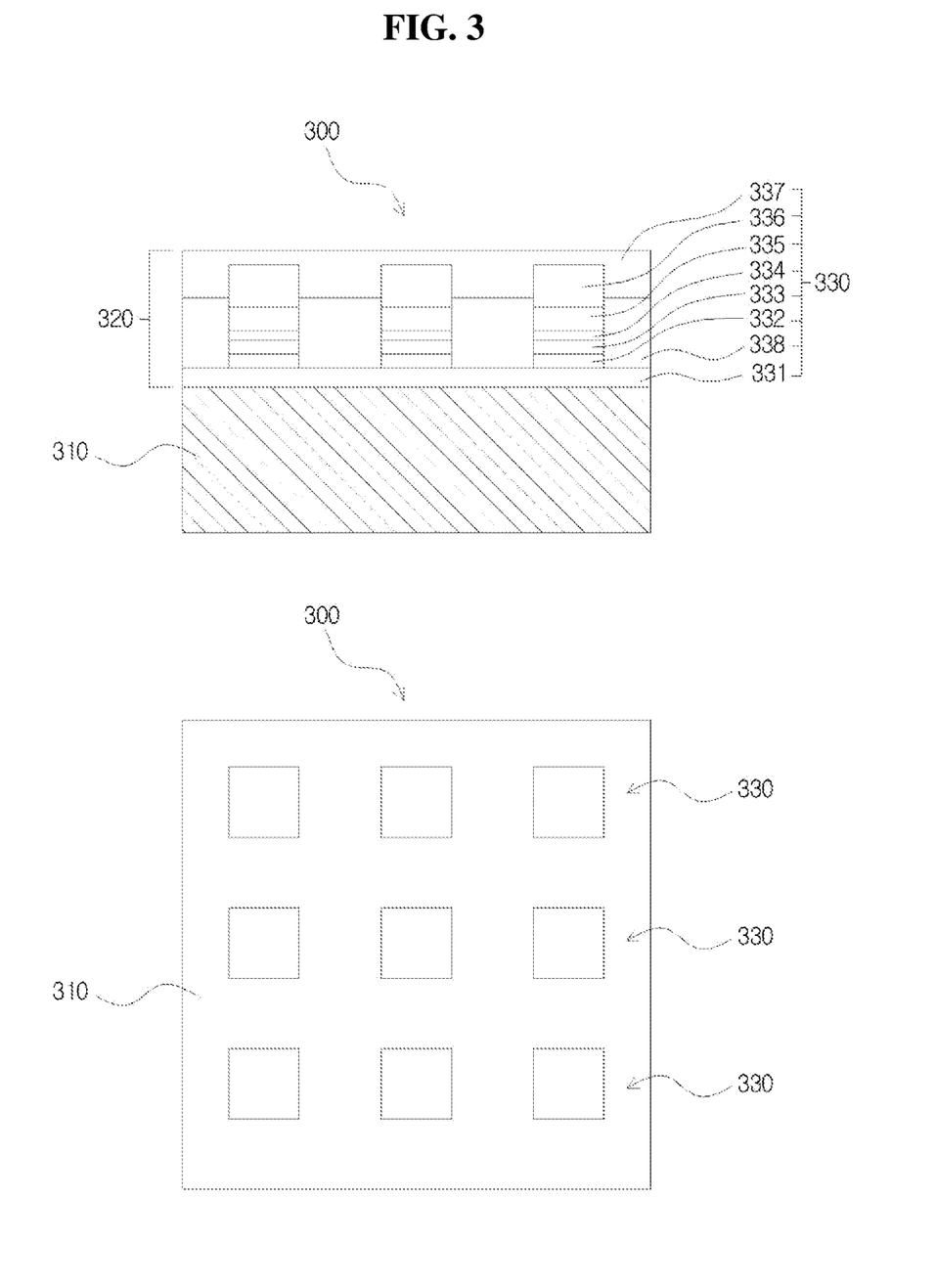
FIG. 3 is a view showing a transparent microLED display skin of the present invention.

Meanwhile, as shown in FIG. 3, the transparent microLED display skin 300 is configured of a transparent flexible substrate 310 having transparency and flexibility, and a semiconductor device layer 320 having microLED pixels 330 transferred and attached on the transparent flexible substrate 310, and coated on the outer surfaces of the top 110 and the bottom 120, respectively.

At this point, the transparent microLED display skins 300 may be fully or partly coated on the outer surfaces of the top 110 and the bottom 120 of the garment 100 as shown in FIG. 1 or FIG. 7, and when the transparent microLED display skins 300 are partly coated, they are configured to be spaced apart from each other at regular intervals, and different colors may be expressed on the transparent microLED display skins 300.

The microLED display is a display in which microLED particles with a size of 5 to 100 μm (1/100,000 Cm) are connected one after another on a substrate (a transparent substrate in the present invention), and it is suitable for implementing a flexible or rollable screen by using an LED chip itself as a pixel, may be used for a long time as power consumption is very small compared to an OLED, and is much excellent from the aspect of illuminance, saturation, and power efficiency compared to existing OLEDs.

The transparent microLED display skins 300 as described above are attached to be coated on the outer surfaces of the top 110 and the bottom 120 of the garment 100, and the transparent microLED display skins 300 respectively use a transparent flexible substrate 310 having both transparency and flexibility to perform the role of a garment as is even when the microLED display does not work, and the pixels made of microLED chips, i.e., the microLED pixels 330, are also configured to maximize the transparency.

On the other hand, the transparent microLED display skin 300 of the present invention is configured by implanting a semiconductor device layer 320 having numerous microLED pixels 330 made of micro p-n diode layer on the transparent flexible substrate 310 in a micro transfer printing technique, and at this point, in performing the transfer printing technique, it is preferable to transfer and attach 10,000 or more microLED pixels 330 per second on the transparent flexible substrate 310 using a roll transfer technique.

The microLED pixels 330 are prepared on a native substrate and then transferred and printed on the transparent flexible substrate 310, and the native substrate and unnecessary portions are then removed thereafter.

The transparent flexible substrate 310 has transparency and flexibility and is selected in a thickness range among 5 to 10 μm, 10 to 50 μm, 50 to 100 μm, 100 to 200 μm, 200 to 500 μm, 0.5 to 1 mm, 1 to 5 mm, and 5 to 10 mm.

As shown in FIG. 3, the transparent microLED display skin 300 is a configuration in which the semiconductor device layer 320 having microLED pixels 330 is formed to be attached on the transparent flexible substrate 310 having both transparency and flexibility.

The microLED pixel 330 of the semiconductor device layer 320 is configured of a positive electrode layer 331, a transparent conductive layer 332, a transparent p-electrode layer 333, a p-GaN layer 334, an active layer 335, an n-GaN layer 336, and an upper transparent n-electrode layer 337, and a transparent insulating layer 338 is formed between the microLED pixels 330. Each of the microLED pixels 330 formed in the semiconductor device layer 320 is a p-n diode layer, which is configured of a compound semiconductor having a band gap corresponding to a specific region in the spectrum, and for example, it is formed of gallium nitride (GaN), which is a III to V nitride material.

The transparent p-electrode layer 333 is a layer for supplying power, and forms an electrode with an oxide containing Al, Ga, Ag, Sn, In, Zn, Co, Ni, or Au having a transmittance of 70% or more. The positive electrode layer becomes a circuit pattern, a bump, or a conductive adhesive layer, and the transparent n-electrode layer 337 has electrical conductivity. The positive electrode layer 331 may be selected from a group of silver and nickel having reflectivity to the visible spectrum, and forms a latent reflective mirror layer.

In addition, the present invention may implement the microLED display skin 300 in full color by arranging three elements, i.e., microLED panels, having red (R), green (G) and blue (B) colors.

In other words, in the present invention, when the transparent microLED display skin 300 of the garment 100 does not operate, the color and design of a general garment are expressed, and when the transparent microLED display skin 300 operates, the colors and patterns may be diversely changed and output to the outside like a TV screen.

Here, when a specific transparent microLED display skin 300 is controlled through the APP, the transparent microLED display skin 300 is controlled by the master unit 400 or the remote slave 500 close to the specific transparent microLED display skin 300, and therefore, it is shown in the present invention that the transparent microLED display skin 300 configured on the top 110 is controlled by the master unit 400, and the transparent microLED display skin 300 configured on the bottom 120 is controlled by the remote slave 500.

In addition, the transparent microLED display skin 300 is configured to be fully or partly configured on the outer surface of the garment 100, and may express various colors and patterns toward the outside of the garment 100 like a TV screen under the control of the smartphone 600 described below.

Figure 4:
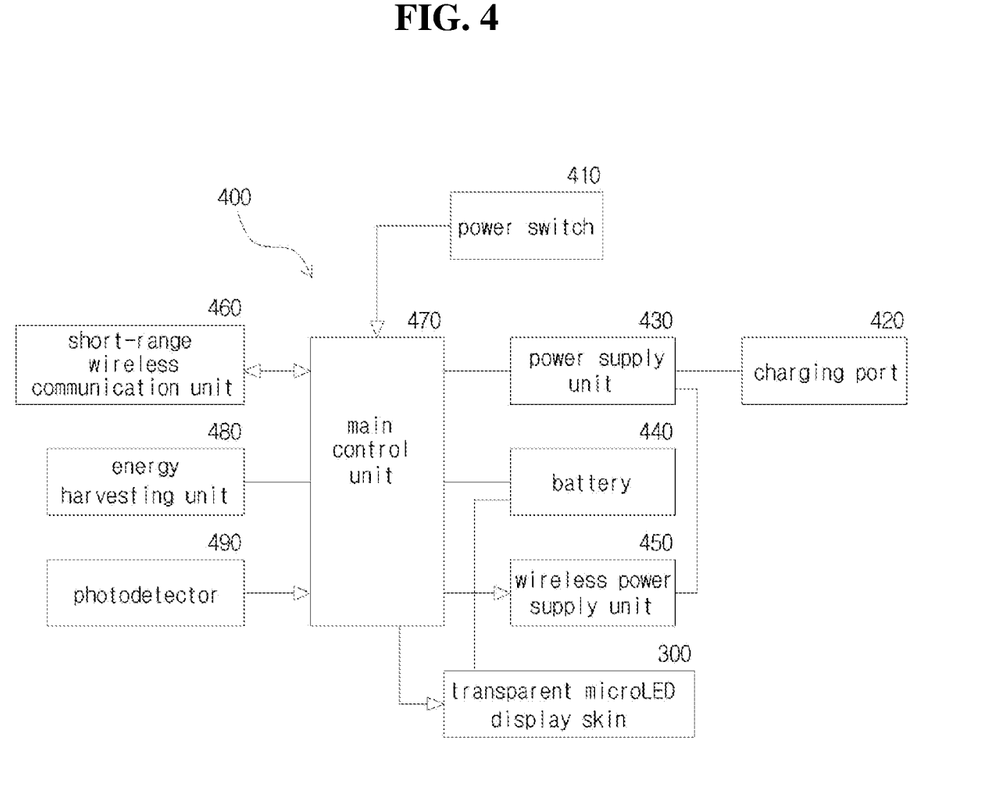
FIG. 4 is a block diagram showing a preferred embodiment of a master unit of the present invention.

Meanwhile, the master unit 400 is configured outside or inside the top 110 of the garment 100 as shown in FIG. 4, and is configured of a power switch 410 for controlling a power supply unit 430, a charging port 420 for charging a battery through a USB cable, the power supply unit 430 controlled by the power switch 410, the battery 440 for storing power charged through the charging port 420, a wireless power supply unit 450 having a wireless electric coil to wirelessly supply power to the power supply unit 430, a short-range wireless communication unit 460 for performing short-range wireless communication with external devices and other devices including a smartphone 600, a main control unit 470 for controlling color expression in the transparent microLED display skin 300, an energy harvesting unit 480 for self-generation of energy, and a photodetector 490 for detecting brightness of light outside the garment.

It is preferable that the IC chip of the main control unit 470 embedded in the top 110 of the garment 100 is implemented as an application specific integrated circuit (ASIC), and wireless electricity and the energy harvesting unit 480 is able to supply energy by applying a solar cell (photovoltaic cell).

Figure 5:
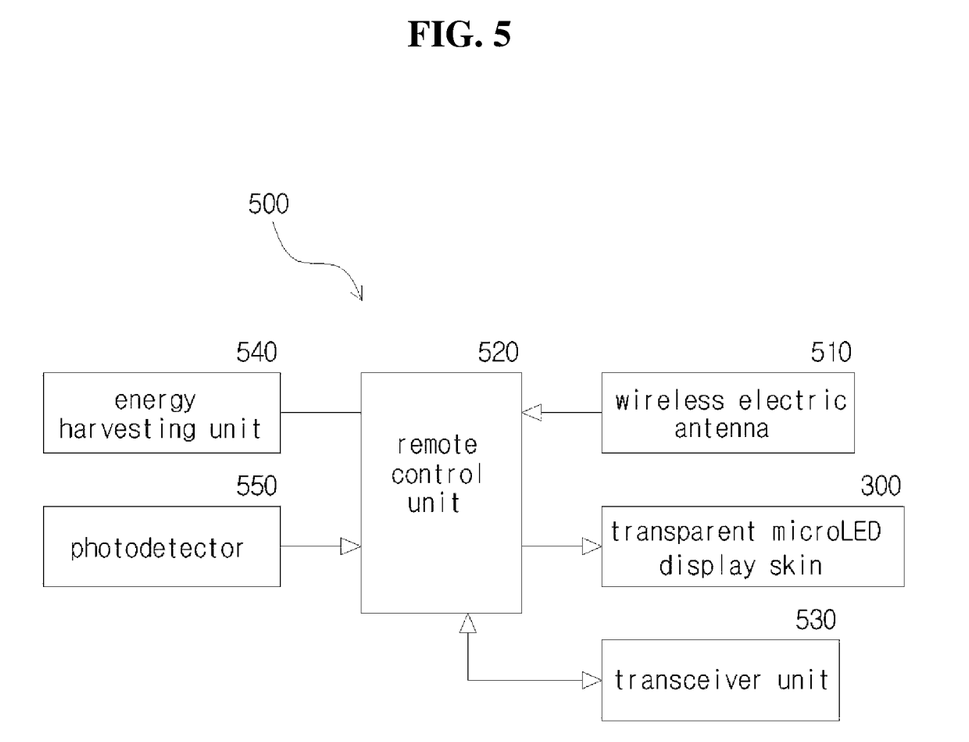
FIG. 5 is a block diagram showing a preferred embodiment of a remote slave of the present invention.

On the other hand, as shown in FIG. 5, the remote slave 500 for wirelessly receiving power supplied from the master unit 400 configured in the bottom 120 of the garment 100 is configured inside the bottom 120 to include a wireless electric antenna 510 for receiving power generated by the wireless power supply unit 450, a remote control unit 520 formed in an IC chip for driving and controlling the transparent microLED display skin 300, a transceiver unit 530 for performing close proximity remote transmission and reception with the master unit 400, an energy harvesting unit 540 for self-generation of energy, and a photodetector 550 for detecting the outside and brightness of (→brightness outside) the garment.

The integrated circuit (IC) of the remote control unit 520 may configure a micron-scale integrated circuit using a complementary-metal-oxide semiconductor (CMOS), and the area of the IC chip is 1 mm×1 mm, and the thickness is preferably 0.5 mm.

Meanwhile, power generated through the resonance phenomenon in the wireless electric coil of the wireless power supply unit 450 configured in the master unit 400 of the present invention is received by the wireless electric antenna 510 of the remote slave 500, and the received power is used to drive the transparent microLED display skin 300 under the control of the remote control unit 520.

Here, the energy harvesting units 480 and 540 are means for harvesting energy in the surroundings and may generate power without receiving power from a separate battery and supply the power to each part inside, and are preferably configured of any one or a combination of a photoelectric element, a thermoelectric element, a piezoelectric element, and a wireless electric conversion element. The photodetectors 490 and 550 detect the amount of external light applied to the garment, and then apply them to the main control unit 470 and the remote control unit 520, respectively, and the main control unit 470 and the remote control unit 520 may control the display luminance brightness of the transparent microLED display skin 300 based on the received amount of light.

Figure 6:
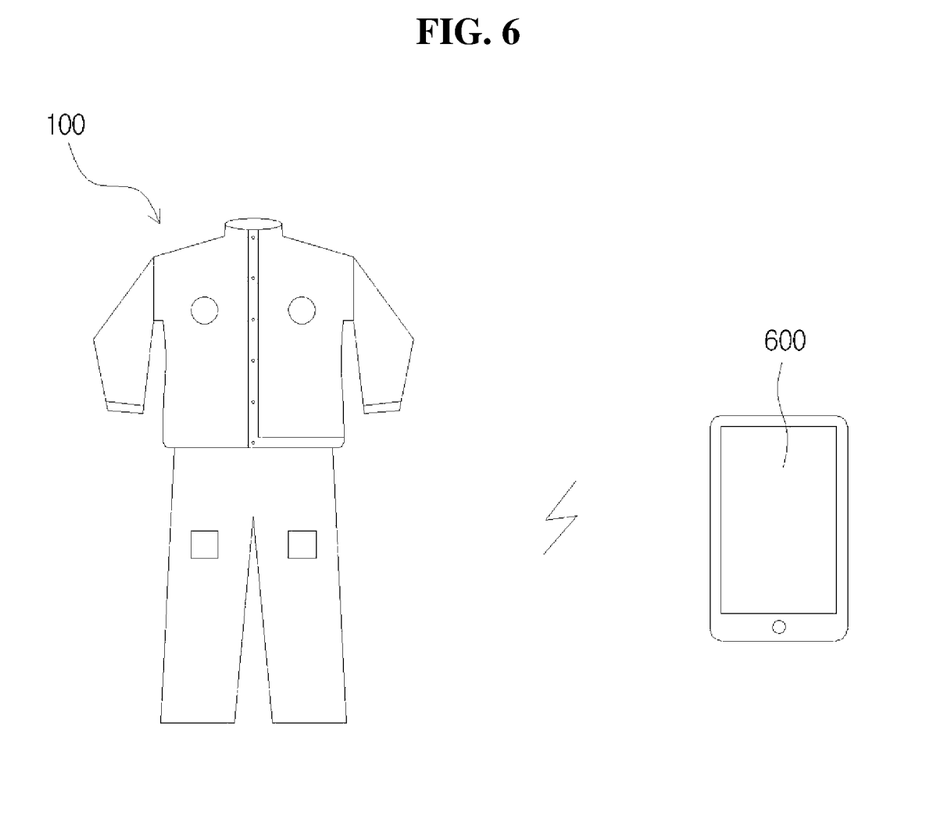
FIG. 6 is a view showing a smartphone and a garment of the present invention operated by a short-range wireless communication method.

In addition, as shown in FIG. 6, a smartphone 600 that a user may practically possess is further provided to include an APP capable of controlling the main control unit 470 or the remote control unit 520 of the master unit 400 or the remote slave 500 through a short-range wireless communication method with the master unit 400 and the short-range wireless communication unit 460 (→the short-range wireless communication unit 460 of the master unit 400).

The wireless transmission and reception method between the master unit 400 and the smartphone 600 may use a Li-Fi technology that implements a fast communication speed using the wavelength of light emitted from an LED, and particularly, when the microLED technique of the present invention is applied, the effect of miniaturizing and lightweighting the parts is increased.

That is, through the smartphone 600 of the present invention, as shown in FIG. 6, change of design and color may be controlled through short-range remote control between the master unit 400 and the remote slave 500 configured in the top 110 and the bottom 120 of the garment 100 and the smartphone 600. The master unit 400 may wirelessly connect to the smartphone 600 using a short-range wireless communication method such as Bluetooth communication, Wi-Fi communication, NFC communication, IR communication, or Li-Fi communication. When users selectively control the APP included in the smartphone 600, various colors may be expressed on the transparent microLED display skin 300 according to a control command, and in the case of a pattern, it can be controlled like a TV screen.

In addition, in operating the transparent microLED display skin 300 using the APP of the smartphone 600 that controls the master unit 400 and the remote slave 500 of the present invention, when a control command is initially transmitted to the master unit 400, the master unit 400 operates the transparent microLED display skin 300, and when the distance between the master unit 400 and a specific transparent microLED display skin 300 is long, the master unit 400 transmits the control command to the remote slave 500, and the remote slave 500 operates the corresponding transparent microLED display skin 300.

That is, when a specific transparent microLED display skin 300 is initially operated using the smartphone 600, the master unit 400 or the remote slave 500 close to the specific transparent microLED display skin 300 in distance operates the specific transparent microLED display skin 300, and thus there is an advantage of quickly and accurately controlling the transparent microLED display skin 300.

Meanwhile, as described above, since the master unit 400, the remote slave 500 and the smart phone 600 may transmit and receive signals through a short-range wireless communication method, when a user initially sets using the APP of the smartphone 600 to control any one transparent microLED display skin 300, the master unit 400 receiving a corresponding signal controls the transparent microLED display skin 300 configured on the top 110, and the remote slave 500 controls the transparent microLED display skin 300 configured on the bottom 120. That is, when a transparent microLED display skin 300 is initially controlled through the smartphone 600, the master unit 400 receives a signal, and when the signal is a control signal for the transparent microLED display skin 300 of the top 110, the master unit 400 controls the transparent microLED display skin 300 configured on the top 110, and when the signal is a control signal for the transparent microLED display skin 300 of the bottom 120, the master unit 400 transmits the signal to the remote slave 500, and the remote slave 500 controls a corresponding transparent microLED display skin 300.

As described above, a self-customized microLED garment to the present invention that can change color and pattern like a TV screen according may selectively control the transparent microLED display skins 300 of the present invention configured in the top 110 and the bottom 120.

The invention claimed is:

1. A self-customizable microLED garment provide with a light emitting function and capable of changing colors and patterns like a TV screen, the garment comprising:
    a garment 100 configured of a top and a bottom that a user wears on a body;
    transparent microLED display skins 300 respectively configured on an outer side of the top 110 and the bottom 120 and including a transparent flexible substrate 310 having transparency and flexibility and a semiconductor device layer 320 having microLED pixels 330 transferred and attached on the transparent flexible substrate 310, and fully or partly coated on the surfaces of the top 110 and the bottom 120;
    a master unit 400 configured outside or inside the top 110 and provided with a power switch 410 for controlling a power supply unit 430, a charging port 420 for charging a battery through a USB cable, the power supply unit 430 controlled by the power switch 410, the battery 440 for storing power charged through the charging port 420, a wireless power supply unit 450 having a wireless electric coil to wirelessly supply power to the power supply unit 430, a short-range wireless communication unit 460 for performing short-range wireless communication with external devices and other devices including a smartphone 600, a main control unit 470 for controlling color expression in the transparent microLED display skin 300 of the garment 100, an energy harvesting unit 480 for self-generation of energy, and a photodetector 490 for detecting brightness of light outside the garment 100;
    a remote slave 500 configured at one end on an outer or inner surface of the bottom 120 and provided with a wireless electric antenna 510 for receiving power generated by the wireless power supply unit 450, a remote control unit 520 for driving and controlling the transparent microLED display skin 300, a transceiver unit 530 for performing close proximity remote transmission and reception with the master unit 400, an energy harvesting unit 540 for self-generation of energy, and a photodetector 550 for detecting outside and brightness (→brightness outside the garment 100); and
    a smartphone 600 including an APP capable of controlling the main control unit 470 or the remote control unit 520 of the master unit 400 or the remote slave 500 through a short-range wireless communication method with the master unit 400 and the short-range wireless communication unit 460 (→the short-range wireless communication unit 460 of the master unit 400), wherein
    the energy harvesting units 480 and 540 are configured of any one or a combination of a photoelectric element, a thermoelectric element, and a wireless electric conversion element, and
    when a specific transparent microLED display skin 300 is controlled through the APP, the transparent microLED display skin 300 is controlled by the master unit 400 or the remote slave 500 close to the specific transparent microLED display skin 300, and
    the microLED pixel 330 is a p-n diode layer, which is a compound semiconductor having a band gap, configured by sequentially stacking a positive electrode layer 331 that becomes a circuit pattern, bump or a conductive adhesive layer, a transparent conductive layer 332, a transparent p-electrode layer 333 for supplying power, a p-GaN layer 334, an active layer 335, an n-GaN layer 336, and a transparent N—GaN layer 337 having electrical conductivity, and a transparent insulating layer 338 is formed between the microLED pixels 330.

2. The garment according to claim 1, wherein the photodetectors 490 and 550 detect the amount of external light applied to the garment 100, and then apply them to the main control unit 470 and the remote control unit 520, respectively, and the main control unit 470 and the remote control unit 520 control display luminance brightness of the transparent microLED display skin 300 based on the received amount of light.

* * * * *